Feb. 29, 1944.  D. O. BRANT  2,342,834
COMPOSITE COUPLING
Filed Jan. 18, 1943
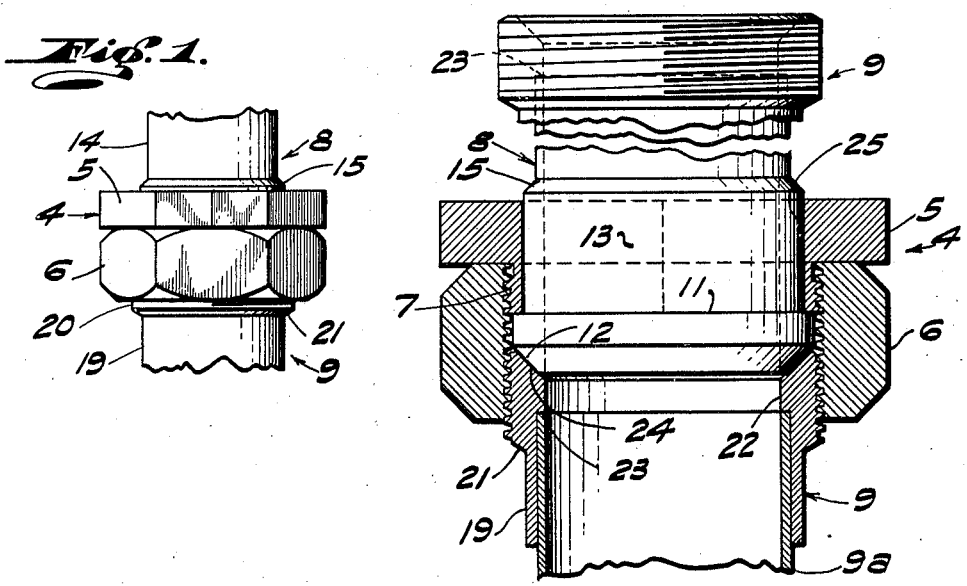
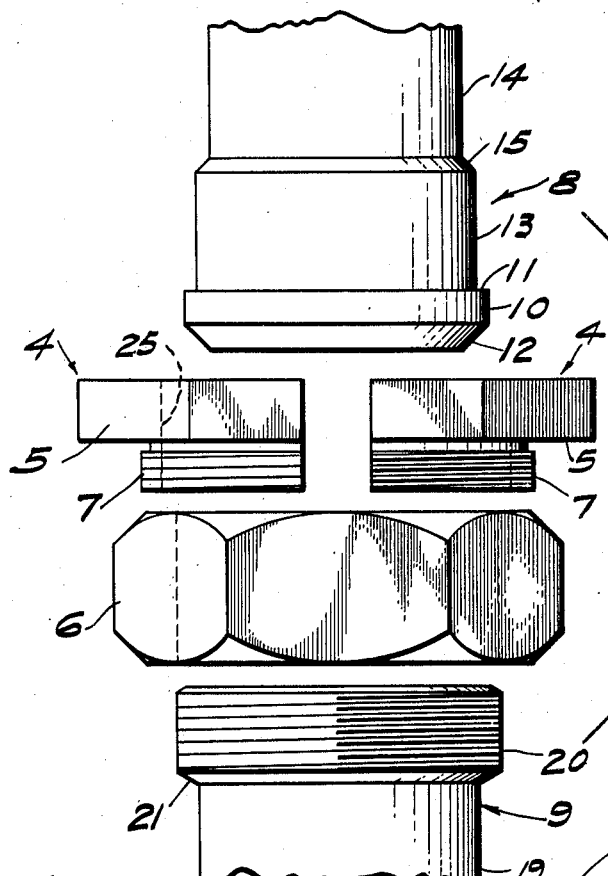
DAVID O. BRANT,
INVENTOR.

Patented Feb. 29, 1944

2,342,834

UNITED STATES PATENT OFFICE 2,342,834

COMPOSITE COUPLING

David O. Brant, Canoga Park, Calif.

Application January 18, 1943, Serial No. 472,745

4 Claims. (Cl. 285—167)

My invention relates to a composite coupling.

More specifically the present invention relates to an improvement in a composite union nut for joining together the open ends of dairy tubing joints in a fluid tight manner.

In the art to which the present invention pertains it is common practice to utilize a threaded nut provided with a shoulder to unite in a leak proof manner the open ends of shouldered pipe sections one of which is threaded and one of which is not threaded, the threads of the nut cooperating with the threads of one pipe-end section to draw the open end thereof into an abutting relation to the end of the other pipe section through the medium of the cooperating shoulder of the nut and shoulder of the latter pipe section.

Furthermore, through the utilization of such a threaded nut as is now commonly used on sanitary, stainless steel milk-conducting pipes or tubes it becomes necessary, preparatory to replacing a worn nut, to remove the welded-on ferrule which is usually provided to carry the pipe shoulder required at its side of the joint.

To overcome this latter difficulty is one of the chief merits of the present invention.

Further objects include:

The provision of a nut assembly which on the whole is more easily cleaned and capable of being properly sterilized and therefore is rendered more sanitary.

To provide a detachable nut which is more durable than those now on the market, the latter being objectionable in that they are considerably cut away resulting in them having only half the bearing or clamping surface of an intact nut and which are therefore more subject to side pull resulting in wear and leaks.

To provide as a new article of manufacture a coupling structure, one element of which is similar to a standard union nut, as already mentioned, except that the threads run straight through the nut and there is no shoulder present; in combination with a split nut or ring constructed to provide a shoulder to be abutted against one end of the first said element and which when so abutted causes the split element to become the driving member for screwing the combined nut element onto the threaded ferrule end of an open pipe section in the performance of the procedure of coupling together two pipe sections, and;

To provide a demountable nut assembly of the kind to which the invention pertains wherein worn or damaged parts may be more easily removed and replaced with new ones, and which is a better wearing nut assembly.

Though, as already stated, this invention is more particularly intended to be used to detachably connect together sections of conduits for liquids that it is desired to maintain in a clean, sanitary condition, such as the milk conduit of a separator or of a homogenizer; however, the device may be used advantageously to connect together and to disconnect from each other sections of pipe used in a variety of other situations.

Other objects, advantages and features of invention will hereinafter appear.

Referring to the accompanying drawing, which illustrates what is at present deemed to be a preferred embodiment of the invention, Fig. 1 is a side elevation, on a smaller scale than that of the remaining views, showing the complete device in its pipe coupling position.

Fig. 2 is a vertical midsection of the structure shown in Fig. 1 except that the upper one of the two pipe sections coupled together is shown in side elevation and a fragment only of the uppermost pipe section is included in the view, such pipe section carrying the conventional threaded ferrule.

Fig. 3 is a side elevation wherein the various parts of the device shown in Fig. 1 are separately shown juxtaposed to each other in as nearly their true relations as is consistent with clear illustration.

Referring in detail to the drawing, the turnable parts of the device are the driving nut, which consists of two segments 4, said nut having a polygonal body portion 5; and the intact, internally screw-threaded annulus 6, said nut segments 4 each having a lateral, semi-circumferential flange 7 which is externally screwthreaded to screw into a side portion of said annulus 6. Said segmental members 4 are shown made as disconnected half nuts. These turnable parts are utilized to clamp together in a fluid-tight manner the pipe-end sections 8 and 9.

The pipe section 8 is surrounded, adjacent to the end thereof which is contained within the coupler, with an unthreaded fixed ferrule 10 consisting of an external, integral annular rise from which results an annular shoulder 11 which faces away from said end of this pipe section, the pipe at the opposite side of the rise 10 having a tapered or beveled face 12 preferably disposed at an angle of about forty-five degrees. By preference and as shown the pipe section 8, near its coupled-on end, has a part 13 which is of greater external diameter than its adjacent part 14, these two portions of differing diameter having an external, inclined annular shoulder 15 at their junction.

The pipe-end structure 9 comprises a body portion 19 and a diametrically enlarged externally screwthreaded end portion 20, there being an external annular beveled shoulder 21 at the juncture of said portions 19 and 20. Within the assembled coupling said pipe section 9 is shown having an annular internal rise 22 at the inner side of which is a right-angled annular shoulder 23 and at the opposite side of which is an internal bevel 24 having an inclination of about forty-five degrees so as to make a close, extended contact with the correspondingly beveled face 12 already mentioned.

The two-part nut 4 has a smooth internal surface 25, said surface being of a uniform internal diameter throughout the length of said nut and in the assembled structure fitting slidably and turnably around the adjacent end portion 13 of the pipe section 8.

The two-part nut is preferably made by clamping the blank therefor in a chuck or jig and thereupon threading the juxtaposed halves thereof in the usual manner and with a pitch corresponding to that of the threads of the annulus 6 and screwthreaded end portion of the pipe section 9. When the composite nut is thus made, the threads of the two halves thereof register with exact nicety.

In the lower portion of Fig. 2 is shown a fragment of dairy tubing 9a which may have an unthreaded ferruled opposite lower end portion similar to the unthreaded ferruled pipe section 8 shown in the upper portion of Fig. 3. Said sections 9a and 8 are shown as parts of standard dairy tubing, and may be sweated into place or may be united to the surrounding structure in any other desired conventional manner, with their ends abutting against shoulders corresponding to the shoulder 23 of Fig. 2.

The construction in the upper portion of Fig. 2 has been added to make it clear that, if the nut 6 had an internal shoulder to abut against the shoulder 11 to perform the clamping action, an end portion of the pipe would have to be cut off and then welded back into place whenever it became necessary to renew a worn out union nut.

In utilizing the device to couple together the pipe-ends 8 and 9, after the annulus 6 has been partially screwed onto the pipe-end section 9 these pipe-ends are brough into an alined abutting relation to each other, and then the two half nuts 4 are abutted against opposite sides of the terminal portion 13 of the pipe-end member 8. The divided nut is then screwed down into the annulus 6 until the annular enlargement or polygonal body portion 5 of its juxtaposed halves abuts against the adjacent side of said annulus, after which said annulus and two-part nut are operated as a standard nut, by applying a wrench to the polygonal portion of the nut, and are thus screwed downwardly (as viewed in Fig. 2) until the end bevel 12 of the pipe-end member 8 is clamped in a fluid tight manner against the bevel 24 of the ferrule or annular rise 22 of the lower pipe-end member. In this clamping together of the two pipe-end sections the end of the flange 7 of the driving nut abuts against the shoulder 11 of the pipe-end section 8 to draw this pipe-end section toward the pipe-end section 9.

It is not essential that the abutting pipe-end surfaces 12 and 24 be beveled, but this is desirable as the wedging action which results makes a tighter joint.

All the screwthreads with which the device is furnished are pitched in the same direction, preferably being international acme threads.

It should be understood that the present disclosure is for the purpose of illustration only and that this invention includes all modifications and equivalents which fall within the scope of the subject matter claimed.

What is claimed is:

1. The combination, with the open end portion of an exteriorly screwthreaded ferruled pipe-end section, and an unthreaded ferruled pipe-end section having an external shoulder facing away from its said end portion; of a coupling comprising an internally screwthreaded annulus to cooperate with the screwthreads of said screwthreaded pipe-end section, and a divided driving nut for assembly about said unthreaded end in contact with said shoulder and adapted to be gripped by a wrench and having an externally screwthreaded flange adapted to be screwed into said annulus, the end of said annulus into which said flange is screwable affording an abutment against which a part of the screwed-in nut acts and thereupon performs the driving function, the screwed-in end portion of said flanged threaded portion of the nut constituting an annular shoulder abuttable against the aforesaid shoulder of the unferruled pipe-end section to urge the two pipe-end sections toward each other.

2. A coupling assembly consisting of a pipe-end member terminating in a diametrically enlarged part, thus providing adjacent to its end to be coupled on an external annular shoulder which faces away from said end; a driving nut consisting of separable flanged segments capable of cooperating to form an annular member including a body portion and an annular flange and having external screwthreads, this flanged portion of said annular member having a turning and sliding fit upon said pipe-end member and being operatively abuttable in an endwise manner against the aforesaid shoulder thereof; an internally screwthreaded annulus into which the flanged part of the annular member made up of said nut segments is screwable until said body portion of the nut abuts against said annulus thereby limiting the extent to which the nut can be screwed into the annulus, whereupon said nut acts as a turnable driving member to turn said annulus also; and a second pipe-end member having an externally screwthreaded portion onto which said annulus when driven by said nut is screwable to bring said two pipe-end sections into an abutting fluid tight relation to each other.

3. A coupling assembly consisting of a pipe-end member terminating in a circular diametrically enlarged part, thus providing adjacent to its end to be coupled on an external annular shoulder which faces away from said end; a driving nut having cooperating segmental parts which in their operative position in the assembly form a complete annular member having a body furnished with a laterally projecting annular flange the inner surface of which alines with the inner surface of said body, said flange being externally screwthreaded and of a less exterior diameter than said body, said annular member being fittable in a turnable and slidable manner around the portion of said pipe-end member which is adjacent to its aforesaid shoulder thereby allowing the end of said flange to be abutted against said shoulder; an internally screwthreaded annulus into which the flanged portion of said annular member is screwable and against which its said body portion is abuttable to limit the extent to which said flanged portion can be screwed into said annulus, and a second pipe-end member having a terminal externally screwthreaded portion onto which said annulus is screwable to clamp said pipe-end members into an abutting relation to each other.

4. A sanitary nut assembly for connecting together dairy tubing joints wherein such joints comprise open end sections of externally screwthreaded ferruled and plain ferruled tubing, said plain ferruled tubing being provided with an annular shoulder whose face is directed away from and is adjacent to the open end thereof that forms one part of the joint; a split ring member consisting of cooperating segments mountable upon the tubing with the plain ferruled end in such a manner that one end of the ring abuts the aforesaid shoulder, the latter ring end being externally screwthreaded with the root of the threads at least equaling the diameter of said annular shoulder, the opposite end of said ring being diametrically enlarged and polygonal thereby providing a shoulder adjacent to and facing its threaded end, and an internally screwthreaded annulus into a portion of which the threaded end of said ring is screwable until the shouldered portion of the ring abuts against said annulus, the remaining threads of said annulus being screwable onto the threaded ferruled end portion of the dairy tubing forming the other part of the joint when a wrench is applied to the polygonal portion of the said ring to advance the open ends of the tubing forming the joint into the desired location.

DAVID O. BRANT.